(12) United States Patent
Tran

(10) Patent No.: US 7,640,099 B2
(45) Date of Patent: Dec. 29, 2009

(54) METHOD AND APPARATUS FOR INPUTTING DATA INDICATING TENTATIVE DESTINATION FOR NAVIGATION SYSTEM

(75) Inventor: Thai Tran, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 122 days.

(21) Appl. No.: 11/732,564

(22) Filed: Apr. 4, 2007

(65) Prior Publication Data

US 2008/0249709 A1  Oct. 9, 2008

(51) Int. Cl.
*G01C 21/30* (2006.01)
(52) U.S. Cl. ............... 701/209; 701/201; 701/300; 340/995.16; 340/995.19
(58) Field of Classification Search ................ 701/200, 701/201, 206, 209, 211, 300; 340/995.16, 340/995.19
See application file for complete search history.

(56) References Cited

U.S. PATENT DOCUMENTS

2006/0129311 A1* 6/2006 Bauman et al. ............. 701/201

2007/0073477 A1* 3/2007 Krumm et al. .............. 701/209

FOREIGN PATENT DOCUMENTS

| JP | 09-042985 | 2/1997 |
| JP | 11-037783 | 2/1999 |

* cited by examiner

*Primary Examiner*—Gertrude Arthur Jeanglaud
(74) *Attorney, Agent, or Firm*—Muramatsu & Associates

(57) ABSTRACT

A method and apparatus allows a user to input a tentative destination which is proximate to an intended destination when the address data for the intended destination is not found in the map database. The method includes the steps of allowing a user to specifying an intended destination in the navigation system and searching address data for the intended destination, notifying the user that the address data is not found in the map database, selecting a method for inputting data indicating a tentative destination which is considered proximate to the intended destination, allowing the user to specify the tentative destination through the selected input method, and determining a location of the tentative destination and detecting address data indicating the location of the tentative destination.

20 Claims, 15 Drawing Sheets

Fig. 4F

Enter ZIP code

ZIP Code 926_

| 7 | 8 | 9 |
| 4 | 5 | 6 |
| 1 | 2 | 3 |
| 0 | OK | |

Fig. 4G

Enter City Name

City TOR_

| A | B | C | D | E | F | G | H |
| I | J | K | L | M | N | O | P |
| Q | R | S | T | U | V | W | X |
| Y | Z | & | / | | | | |
| SPACE | | BS | | ENTER | | RET | |

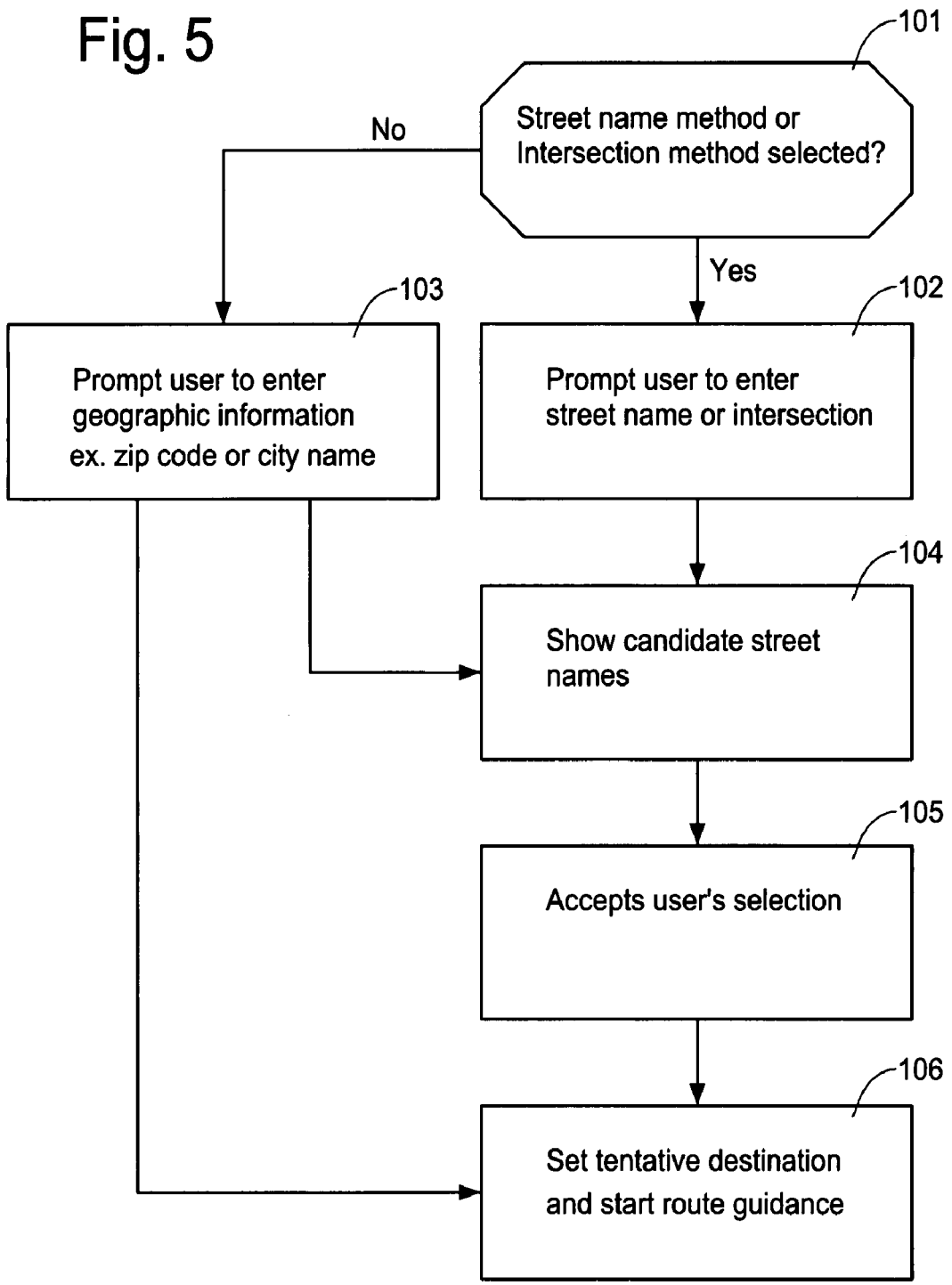

METHOD AND APPARATUS FOR INPUTTING DATA INDICATING TENTATIVE DESTINATION FOR NAVIGATION SYSTEM

FIELD OF THE INVENTION

This invention relates generally to a method and apparatus for inputting data in a navigation system, and more particularly, to a method and apparatus for inputting a location proximate to an intended destination as a tentative destination when the address data that directly indicates the location of the intended destination is not found in the map database of the navigation system.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM, a DVD, or a hard disc. Typically, the navigation system displays a map image on a monitor screen to guide the user to a destination.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIG. 1B-1F. FIG. 1B show a "Find Destination by" screen for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1B, the navigation system displays selection methods of point of interest (POI) either by "Place Name" or "Place Type" in FIG. 1C. The "Place Name" is to specify a name of the intended POI, and the "Place Type" is to specify a category of the intended POI. If the "Place Name" is selected in FIG. 1C, the navigation system displays a keyboard screen so that the user inputs the desired POI name as shown in FIG. 1D.

In FIG. 1E, as the user enters characters of a place name or specifies a particular place type, the navigation system narrows down the candidate place name by searching a map database. FIG. 1F shows a screen where the candidate POI name is displayed thereon as a result of the user's input. In FIG. 1G, when the user confirms that the candidate POI is a desired place to go, the navigation calculates an appropriate route to the destination. After determining the calculated route to the destination, the navigation system starts the route guidance operation as shown in FIG. 1H.

As in the foregoing example, typically, the information concerning the intended destination is stored in the data storage medium of the navigation system. However, there arises a case where an address, a place name or other information on a particular location is not found in the map database in the data storage medium. For example, when a new shop or a new restaurant is started or a road name is changed, etc., the map database of the user's navigation system may not include the data on the new shop, restaurant or the new road name because the map database may not be updated so frequently.

Such a condition is explained with reference to FIG. 2 which shows a map image in which a current position of a user's vehicle is indicated by a reference number 13. It is assumed that a location 11 is a place where the user wants to go, i.e., an intended destination, although the map database does not include address data for the location 11. Several roads are shown on the map image that are indicated by reference numerals 21, 23, 25, 27 and 29.

Since the navigation system cannot recognize the user's destination, it simply draws a line from the current vehicle position 13 to the location 11 as shown in FIG. 2. This may happen when the user specifies the location 11 on the map image which is not in the map database of the navigation system because it is a new road, new house, etc. Since the navigation system is unable to calculate a route to the intended destination 11, it is unable to perform the route guidance operation either.

In a navigation system, it is necessary to specify an address by inputting a street number (house number) and a street name to pin-point the destination. Thus, in the situation described above, the user will not only fail to arrive at the destination, but also will fail to approach a location proximate to the destination. In the situation of FIG. 2, it would be helpful for the user if a navigation system is able to guide the user to a location close to the intended destination.

Thus, there is a need of a new method and apparatus for a navigation system which is capable of assisting the user to arrive at a location proximate to the intended destination when an address of the intended destination is unavailable in the map database.

SUMMARY OF THE INVENTION

It is, therefore, an object of the present invention to provide a method and apparatus for a navigation system which is capable of assisting the user to arrive at a location proximate to the intended destination when an address of the intended destination is unavailable in the map database.

It is another object of the present invention to provide a method and apparatus for a navigation system which is capable of inputting data indicating a tentative destination when an address of the intended destination is not found in the map database.

It is a further object of the present invention to provide a method and apparatus for a navigation system which is capable of inputting data leading to a tentative destination through various input methods and determining a location of the tentative destination through predetermined methods such as finding a center point of a specified area.

One aspect of the present invention is a method for a navigation system which allows a user to enter data indicating a tentative destination when address data for an intended destination is not found in the map database. The method includes the steps of: allowing a user to specifying an intended destination in the navigation system and searching address data indicating the intended destination in a map database, notifying the user that the address data indicating the intended destination is not found in the map database, selecting a method for inputting data indicating a tentative destination which is considered proximate to the intended destination, allowing the user to specify the tentative destination in the navigation system through the selected input method, and determining a location of the tentative destination and detecting address data indicating the location of the tentative destination.

In the method of the present invention for inputting data indicating a tentative destination, the input method allows the user to specify a street name which is considered by the user proximate to the intended destination, and the step of determining the location of the tentative destination includes a step of finding a middle point of the street specified by the user and determining the address data of the middle point.

In the method of the present invention for inputting data indicating a tentative destination, the input method allows the user to specify an intersection which is considered by the user proximate to the intended destination by selecting two street names. The navigation system displays a list of candidate street names so that the user selects one or more street names from the list.

In the method of the present invention for inputting data indicating a tentative destination, the input method allows the user to specify a city name which is considered by the user proximate to the intended destination, and the step of determining the location of the tentative destination includes a step of finding a center point of the city specified by the user and determining the address data of the center point.

In the method of the present invention for inputting data indicating a tentative destination, the input method allows the user to specify an area by a zip code which is considered by the user proximate to the intended destination, and the step of determining the location of the tentative destination includes a step of finding a center point of the area specified by zip code and determining the address data of the center point.

In the method of the present invention for inputting data indicating a tentative destination, the input method allows the user to specify a geographical area by a city name or a zip code and also to specify a street name, and the step of determining the location of the tentative destination includes a step of finding a middle point of the specified street within the specified geographical area and determining the address data of the middle point.

In the method of the present invention for inputting data indicating a tentative destination, the input method allows the user to specify a geographical area by a city name or a zip code and also to specify an intersection by selecting two street names, and the step of determining the location of the tentative destination includes a step of finding the intersection within the specified geographical area.

Another aspect of the present invention is an apparatus for a navigation system which allows a user to enter data indicating a tentative destination when address data for an intended destination is not found in the map database by implementing the various steps of the input method described above. The navigation system of the present invention enables to specify the tentative destination which is considered proximate to the intended destination and to guide the user to the tentative destination.

According to the present invention, in the case where address data for an intended destination is not found in the map database, the navigation system is designed to accept a tentative destination which is close to the intended destination through various input methods. The navigation system calculates a route to the tentative destination and guides the user to the tentative destination through the calculated route. The user may be able to find the intended destination when he/she arrives at or comes close to the tentative destination. Especially, if the user came to the intended destination before, he/she may be familiar with the area proximate to the intended destination and can find the location of the intended destination once he/she arrives at the tentative destination.

BRIEF DESCRIPTION OF THE DRAWINGS

FIG. 3A shows a street name method, FIG. 3B shows an intersection method, FIG. 3C shows a city name method, FIG. 3D shows a zip code method, FIG. 3E shows a combination of a city name method and an intersection method, and FIG. 3F shows a combination of a zip code method and a street name method.

FIGS. 4A-4K are display examples of the navigation system under the present invention for specifying a location proximate to an intended destination by implementing the methods of FIGS. 3A-3F when address data for the intended destination is not found in the map database.

FIG. 5 is a flow chart showing the basic operational steps in an overall procedure for setting a tentative destination in the navigation system.

DETAILED DESCRIPTION OF THE PREFERRED EMBODIMENT

The method and apparatus for inputting data for a tentative location under the present invention is explained in detail with reference to the accompanied drawings. In the present invention, if address data for an intended destination is not found in the map database, the navigation system functions to accept a tentative destination which is close to the intended destination through various input methods. The navigation system calculates a route to the tentative destination and guides the user to the tentative destination through the calculated route.

The user may be able to find the intended destination when he/she arrives at or comes close to the tentative destination. In such a situation, especially, if the user came to the intended destination before, it is expected that he/she may be familiar to the area proximate to the intended destination and can find the location of the intended destination once he/she arrives at the tentative destination. It should be noted that the description will be made for the situation where the data input method and apparatus is applied to a vehicle navigation system, but the data input method and apparatus under the present invention can be implemented to other devices, such as portable devices or personal computers.

The present invention for inputting data regarding a tentative destination which is proximate to the truly intended destination can be implemented through various methods. FIGS. 3A-3F are schematic diagrams showing examples of method for inputting the data for the tentative destination in the present invention. In the example of FIGS. 3A-3F, the intended destination is denoted by a reference number 11 and the tentative destination is denoted by a reference number 33.

Figure 3A:
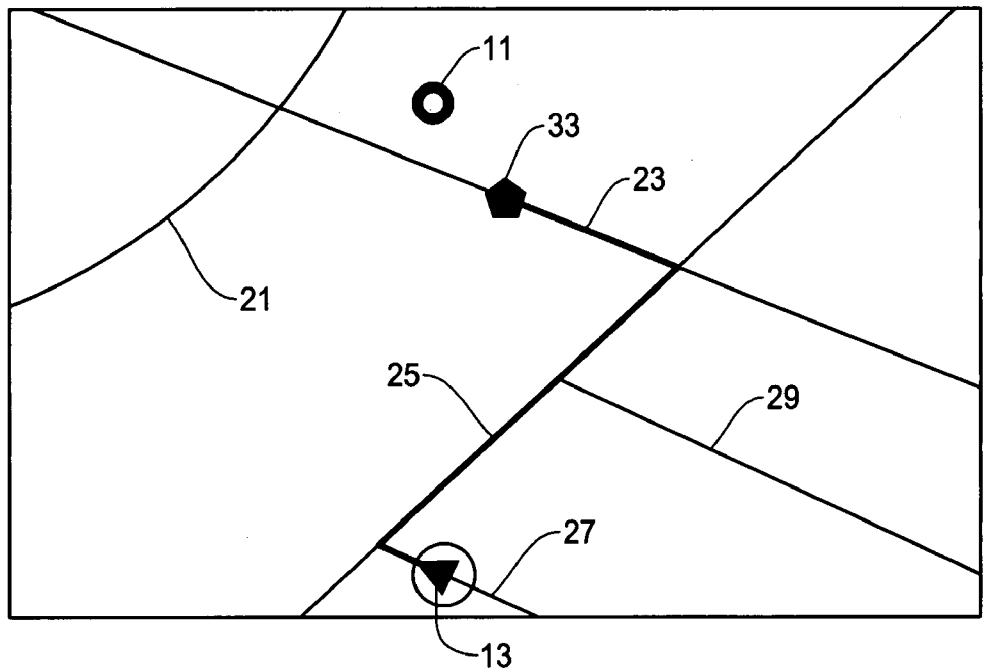
FIGS. 3A-3F are schematic diagrams showing examples of method for inputting the data for a tentative destination in the navigation system under the present invention where
Figure 3B:
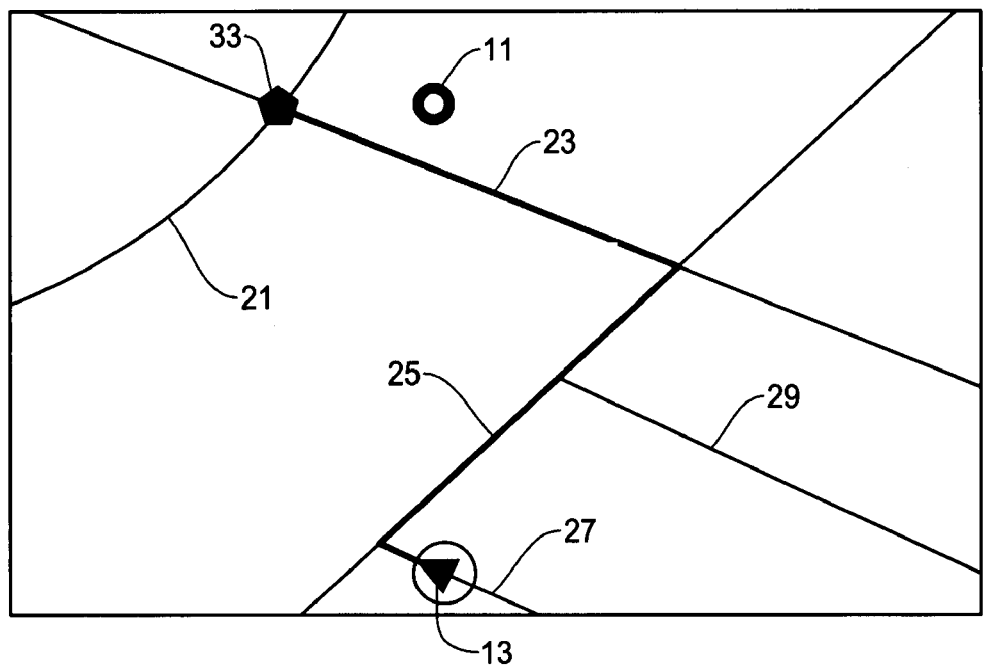
Figure 3C:
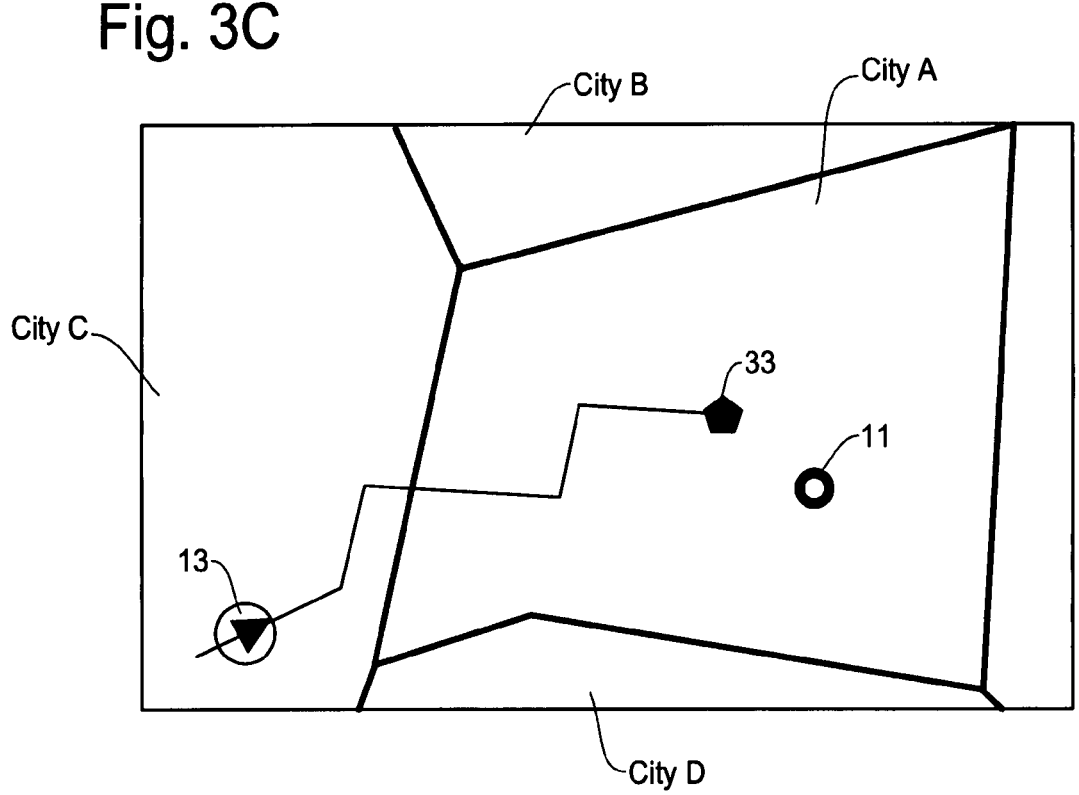
Figure 3D:
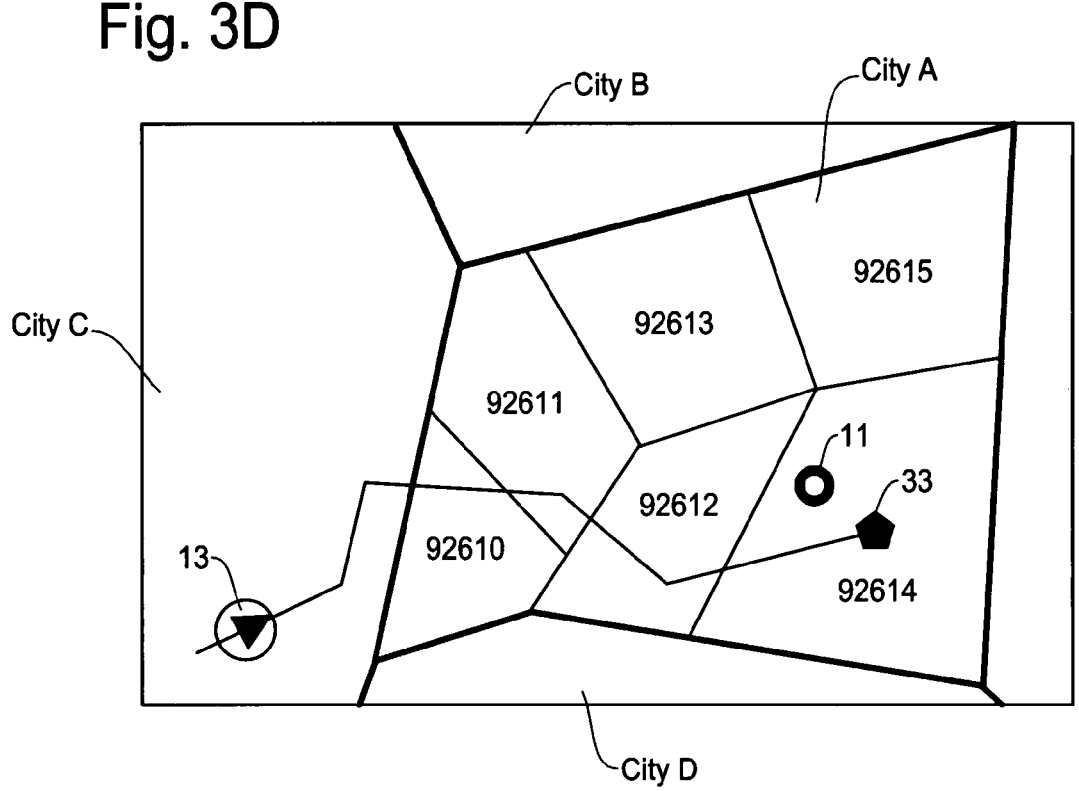
Figure 3E:
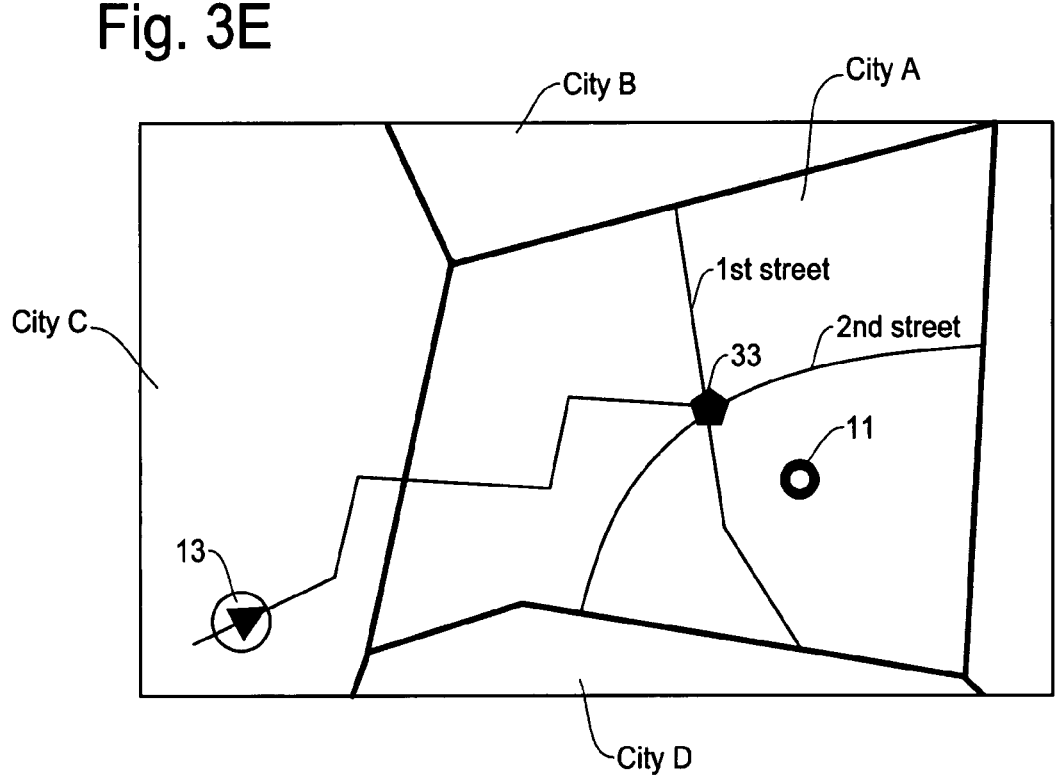
Figure 3F:
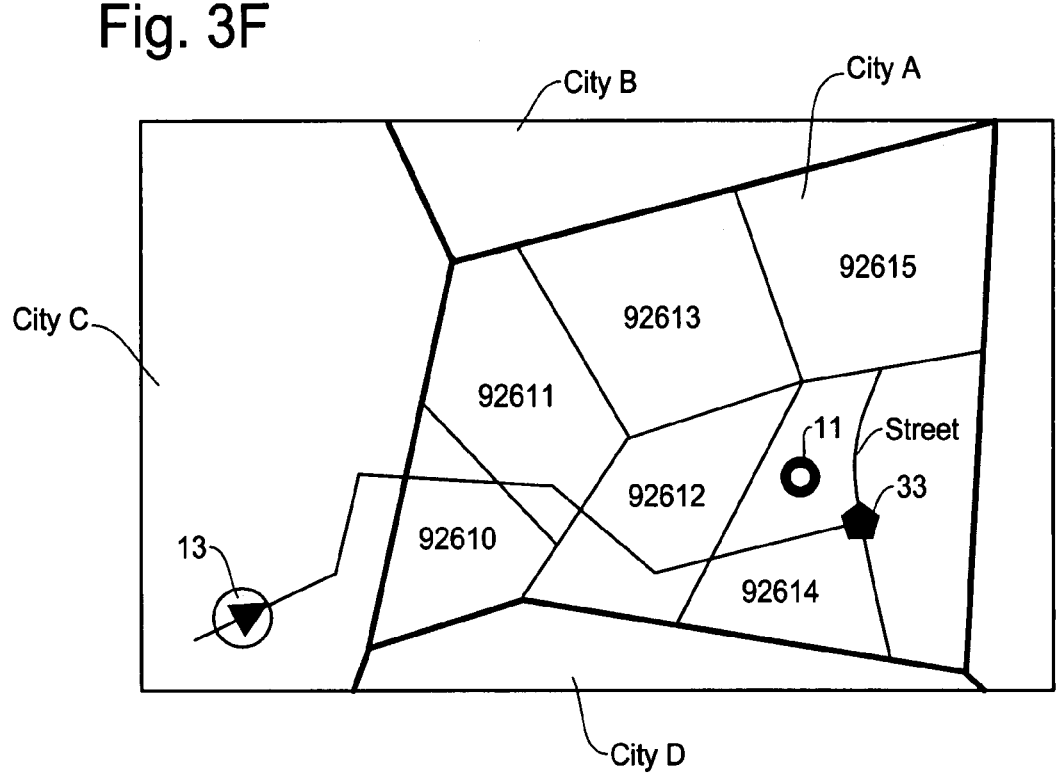

FIG. 3A shows a street name method for specifying a tentative destination based on a selected street name, FIG. 3B shows an intersection method for specifying a tentative destination based on a selected intersection, FIG. 3C shows a city name method for specifying a tentative destination based on a selected city name, FIG. 3D shows a zip code method for specifying a tentative destination based on a selected zip code, FIG. 3E shows combination of a city name method and an intersection method for specifying a tentative destination based on a selected city name and a selected intersection, and FIG. 3F shows combination of a zip code method and a street name method for specifying a tentative destination based on an area specified by a zip code and a selected street name.

The street method of FIG. 3A may be used when the user knows only the street name that is considered close to the intended destination. The intersection method of FIG. 3B may be used when the user knows the names of the two streets when the true destination is considered to be close to the intersection constituted by the two streets. The city name method of FIG. 3C may be used when the user knows only a city name in which the true destination is considered to exist. The zip code method of FIG. 3D may be used when the user knows the zip code of an area in which the true destination is considered to exist.

The street name method of FIG. 3A can be combined with the city name method of FIG. 3C or the zip code method of FIG. 3D. Such an example is shown in FIG. 3F in which the street name method is applied within the area specified by the zip code. The intersection method of FIG. 3B can be combined with the city name method of FIG. 3C or the zip code method of FIG. 3E. Such an example is shown in FIG. 3E in which the intersection method is applied within the specified city. Each of the methods of FIGS. 3A-3F will be described with reference to display examples of FIGS. 4A-4K.

Figure 1A:
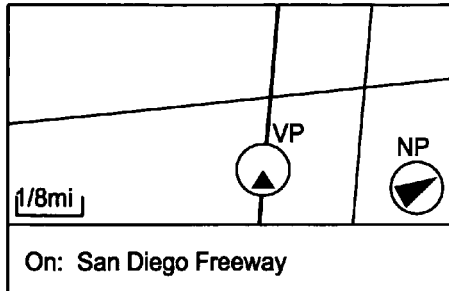
FIGS. 1A-1H are schematic diagrams showing an example of operational process and screen display involved in the navigation system for selecting a destination and performing a route guidance operation to the destination.
Figure 1B:
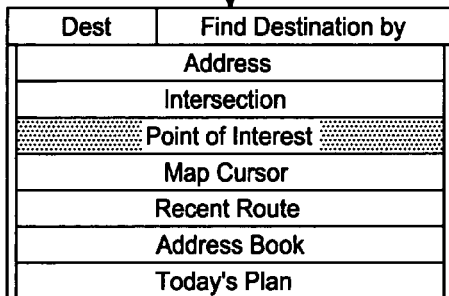
Figure 1C:
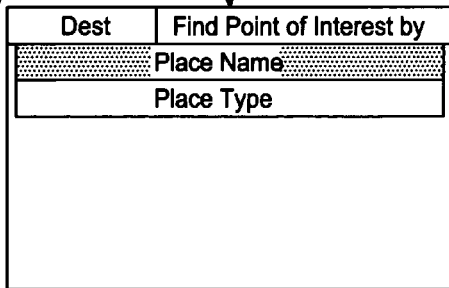
Figure 1D:
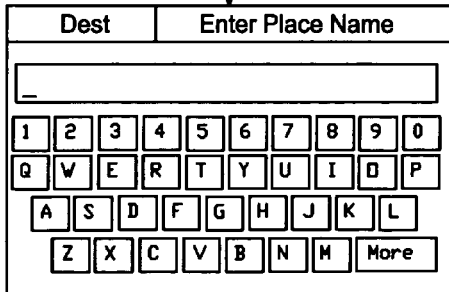
Figure 1E:
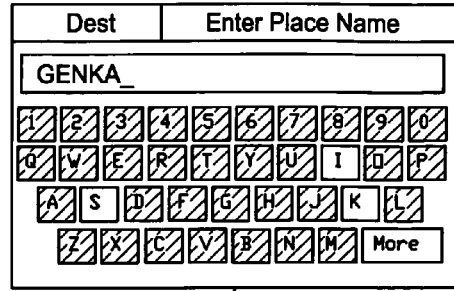
Figure 1F:
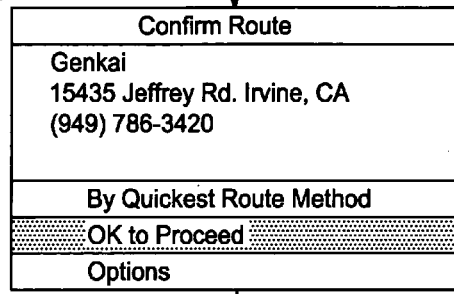
Figure 1G:
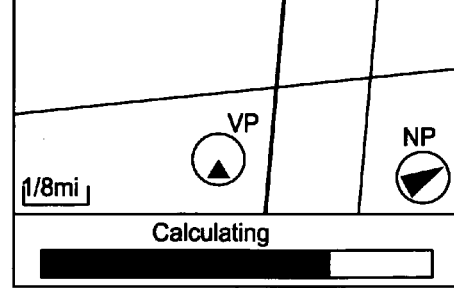
Figure 1H:
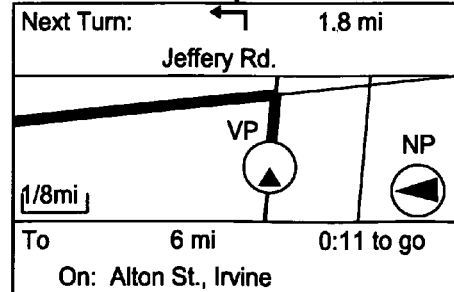
Figure 2:
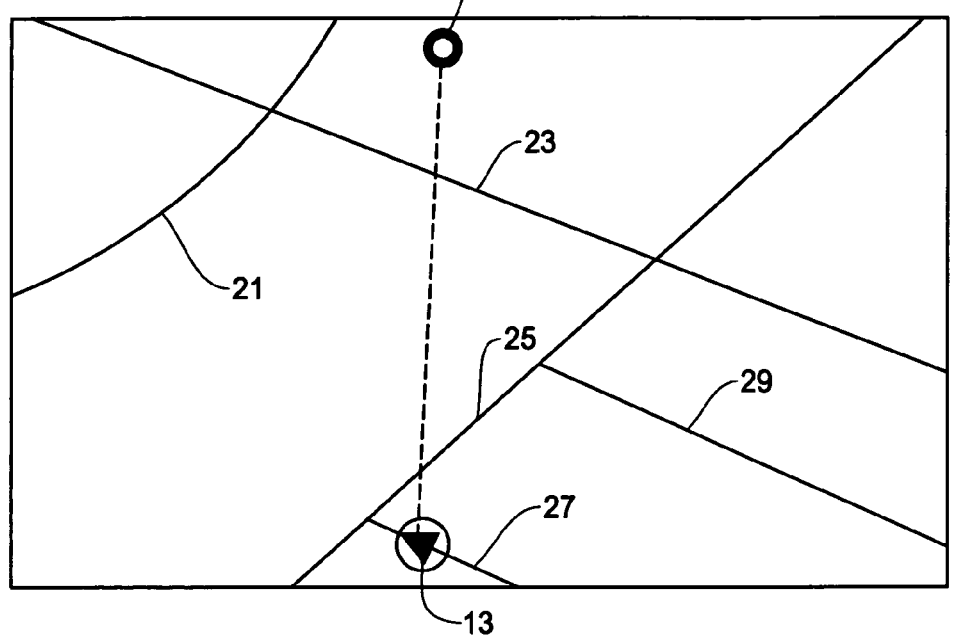
FIG. 2 is a schematic diagram showing a situation where address data of the intended destination is not found in the map database of the navigation system.

FIGS. 4A to 4K are schematic diagrams showing display examples of the navigation system for inputting the tentative destination data based on various methods shown in FIGS. 3A-3F. The display example of FIG. 4A includes a keyboard so that the user is able to enter an address (ex. street name, house number) or place name (ex. name of a POI (point of interest)) of an intended destination in an input field 71. This screen corresponds to the screen of FIGS. 1D and 1E to input a place name in the navigation system through a keyboard.

Figure 4A:
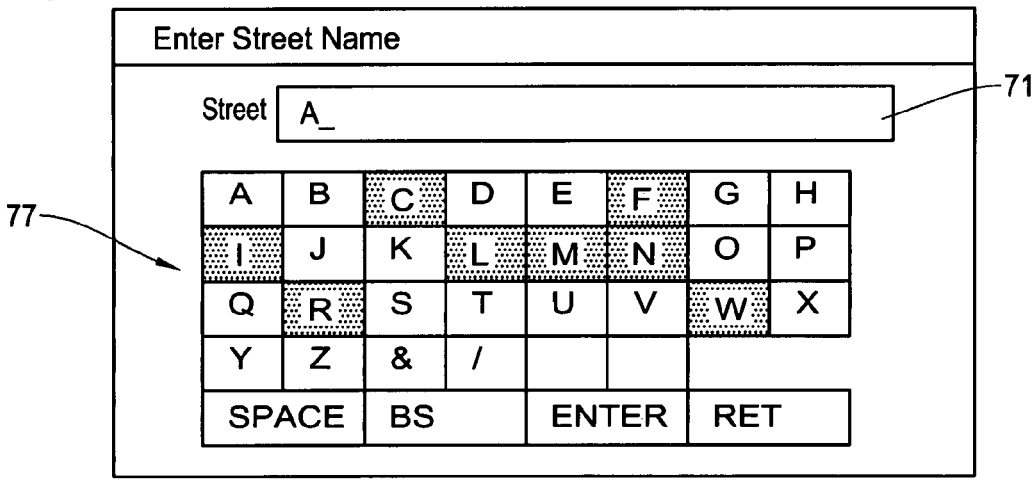

It is assumed that when the user inputs an address of an intended destination through the display of FIG. 4A but the navigation system is unable to find the data destination in the map database. Then, the navigation system shows a screen that notifies that the desired destination (intended destination) is not found in the map database as shown by a screen 79 of FIG. 4B. Moreover, the navigation system also informs that it is able to calculate a practical (partial) route to a location proximate to the desired destination. Here, within the context of the present invention, such a location considered to be proximate to the intended destination will also be referred to as a "tentative destination".

Figure 4B:
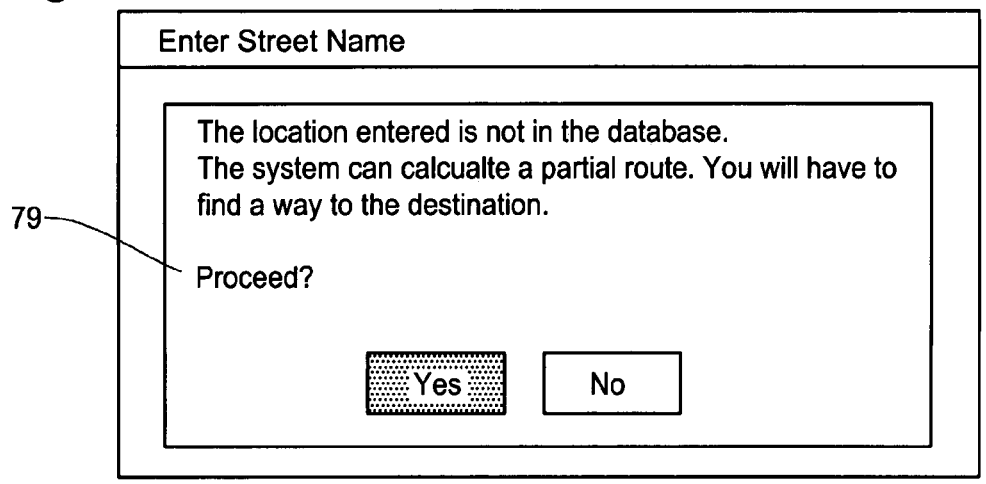

In the example of FIG. 4B, the navigation system also explains that the user has to find the desired destination without the guidance by the navigation system after the guidance to the tentative destination (proximate location). Thus, in FIG. 4B, the user may select either "Yes" for practical guidance to the proximate location or "No" for no route guidance. In the practical guidance, the navigation system calculates a route to a location (tentative destination) proximate to the intended destination and guides the user to the tentative destination. In other words, the navigation provides the route guidance through a partial route to the intended destination.

Figure 4C:
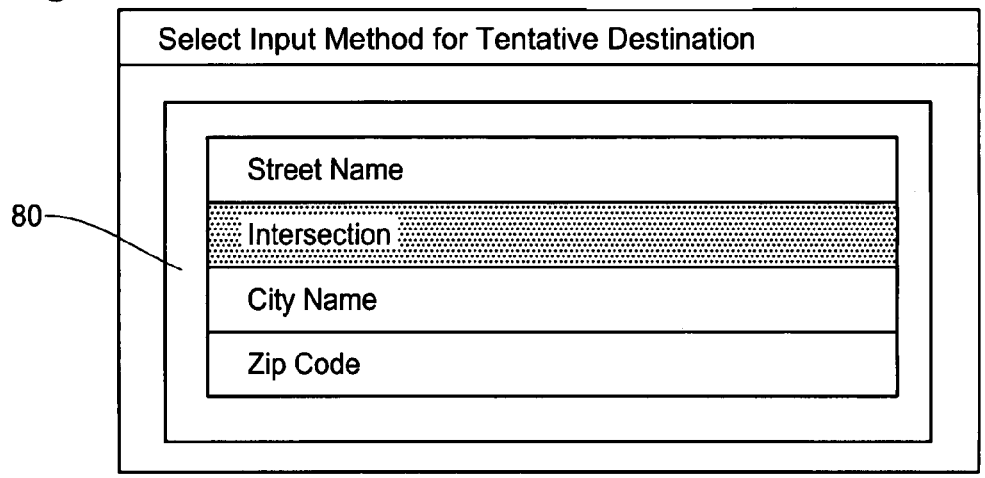

As noted above, the navigation system may have several functional methods to find a proximate location (tentative destination). Thus, when the user selects "Yes" in FIG. 4B, the navigation system will display a screen 80 that lists various methods for inputting the data for the tentative destination as shown in FIG. 4C. In this example, the navigation system prompts the user to select one or more methods out of a street name method, an intersection method, a city center method, and a zip code method. It is preferable that the navigation system is designed so that the user can select at the same time, thereby enabling the combined input methods of FIGS. 3E and 3F noted above.

The street name method can be used if the user knows a street name that is reasonably close to the desired destination. When selecting this method, the user is promoted to enter the street name in a display similar to that shown in FIG. 4A. Assuming that the user has no idea about the house number, he/she simply inputs the street name that is considered close to the intended destination through the keyboard screen such as shown in FIG. 4A.

In such a case, the street name method works in the manner shown in FIG. 3A in which the navigation system will find an approximate middle point of the selected street and set the middle point as a tentative destination. Namely, in the example of FIG. 3A, if the street name specifies a street that is indicated by the reference number 23, the navigation system determines a middle point 33 of the street 23 as a tentative destination. The navigation system calculates a route to the middle point 33, i.e., a partial route to the intended (true) destination 11, by detecting the address data of the middle point 33 from the map database and guides the user to the middle point 33, i.e., the tentative destination.

Figure 4D:
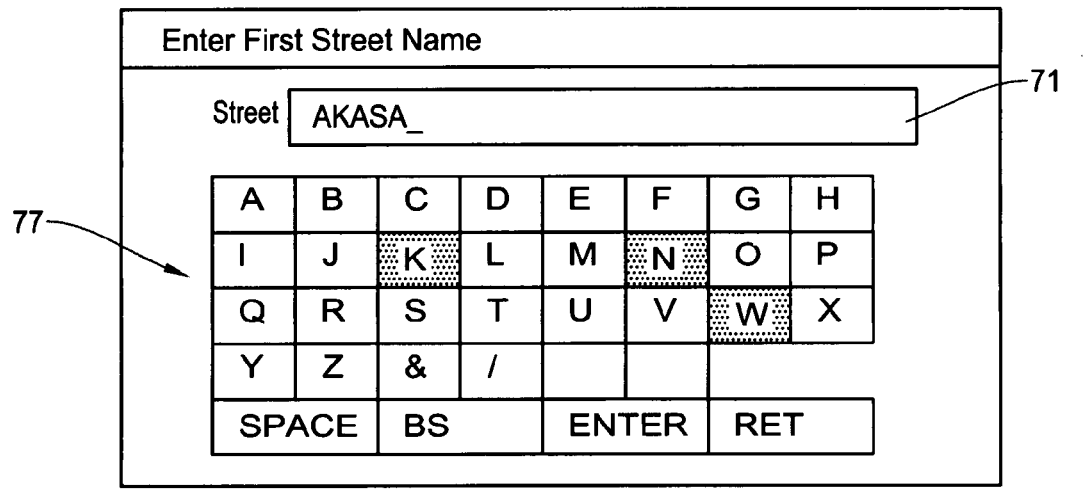
Figure 4E:
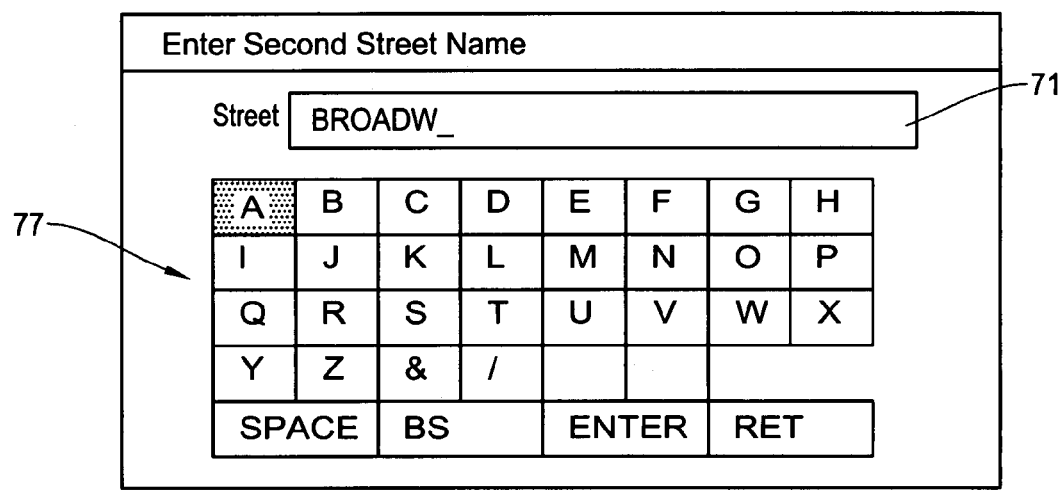

If the user selects the intersection method in FIG. 4C, the navigation system displays a screen 77 as shown in FIGS. 4D and 4E for prompting the user to specify two street names that constitute an intersection. Namely, the intersection method allows the user to specify a location (tentative destination) by an intersection rather than by a street name or a house number. The schematic view of FIG. 3B shows the situation where an intersection 33 (tentative destination) is formed by a street 21 and a street 23. Once the intersection 33 is specified, the navigation system calculates a route to the intersection 33, i.e., a partial route to the intended (true) destination 11 by detecting address data of the intersection 33, and guides the user to the intersection 33.

As will be explained below, the method and apparatus for inputting data under the present invention enables the user to input an intersection in various ways as a tentative destination that is close to the intended destination. In the example of FIG. 4D, the navigation system prompts the user to enter a first street name that constitutes the intersection. After selecting the first street name, the user enters a second street name that constitutes the intersection as shown in FIG. 4E.

Figure 4H:
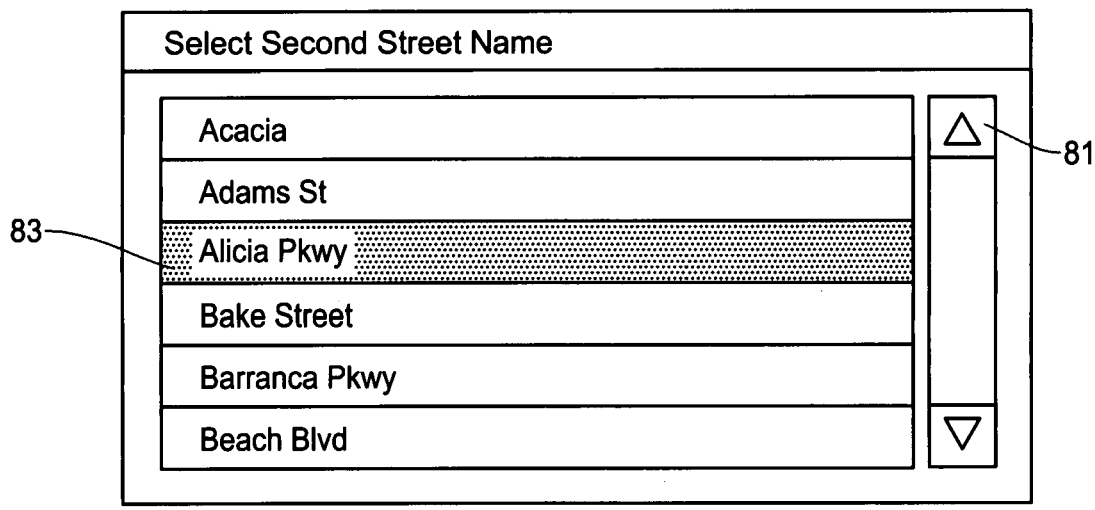
Figure 4I:
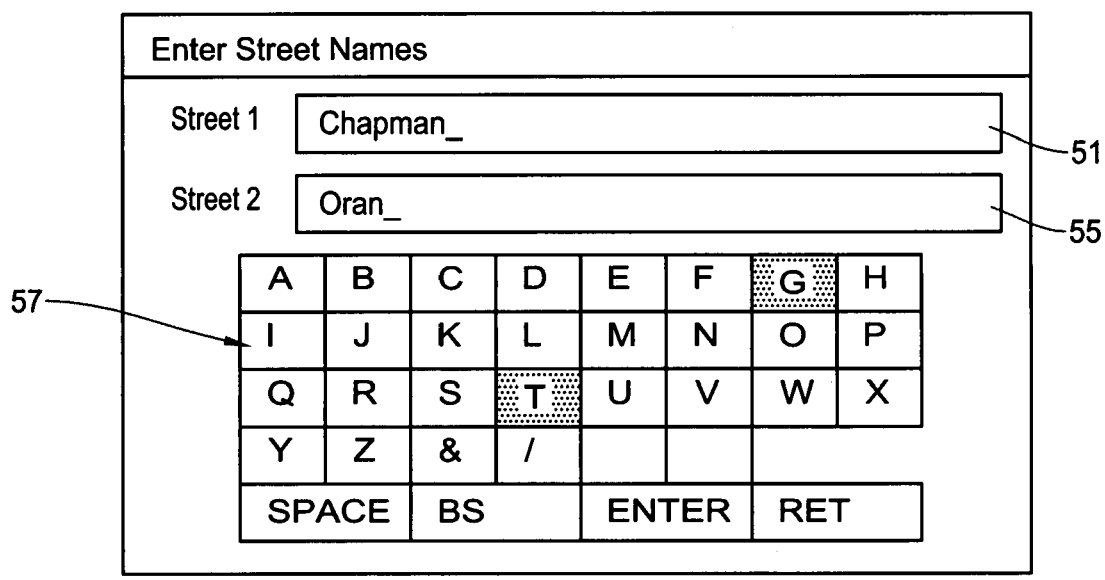

After the user has selected the first street name, the navigation system may display a list of candidate second streets that intersect with the first street as shown in FIG. 4H. This helps the user to easily and quickly find the second street name from the candidate street names. Another display example for specifying the intersection is shown in FIG. 4I. In this example, the screen includes two input fields 51 and 55 for entering the first street name and the second street name, respectively.

FIG. 4F shows an example of display on the navigation system when the user has selected the zip code method in the process of FIG. 4C. This display includes a numeric keyboard 85 so that the user is able to enter a zip code of an area that includes the intended destination. The schematic view of FIG. 3D shows an example of zip code method in which the navigation system determines a geographical center point 33 of the area defined by a zip code as a tentative destination which is considered by the user proximate to the intended destination. Once the zip code is specified, the navigation system calculates a route to the center point 33 of the area specified by the zip code, i.e., a partial route to the intended (true) destination 11 by detecting address data of the center point 33, and guides the user to the center point 33.

Similarly, FIG. 4G shows an example of display on the navigation system when the user has selected the city name method in the process of FIG. 4C. This display includes an alphabetic keyboard 77 so that the user is able to enter a city name that includes the intended destination. The schematic view of FIG. 3C shows an example of city name method in which the navigation system determines a geographical center point 33 of the selected city name A as a tentative destination which is considered by the user proximate to the intended destination. Once the city name is specified, the navigation system calculates a route to the center point 33 of the city, i.e., a partial route to the intended (true) destination 11 by detecting address data of the center point 33 with use of the map database, and guides the user to the center point 33.

In the zip code method noted above, rather than calculating the center point, the navigation system may prestore the address data on the center location that represents an approximate central location of each zip code area. Further, the navigation system may display a list of candidate street names that are located in the whole area specified by the zip code or a center portion of the area specified by the zip code.

Similarly, in the city name method noted above, rather than calculating the center point, the navigation system may prestore the address data on the center location that represents an approximate central location of each city. Further, the navigation system may display a list of candidate street names that are located in the whole area of the city or a predetermined area such as a central area of the city specified by the user.

Figure 4J:
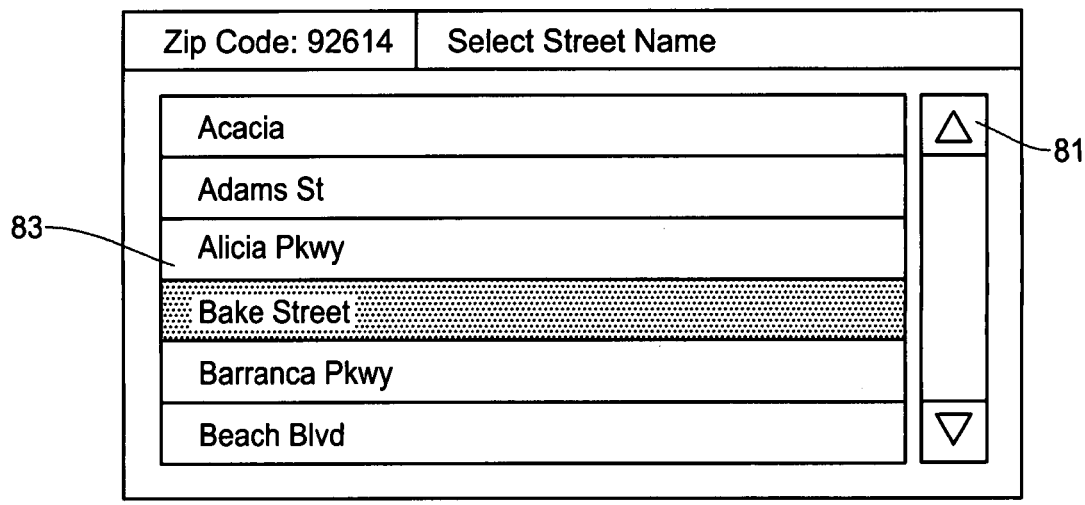

FIG. 4J is an example of screen for implementing the input method of FIG. 3F in which the street name method is applied to the area specified by the zip code. When the user selects both the zip code method and the street name method in the process of FIG. 4C, the navigation system may display a list 83 of street names within the area specified by the zip code as shown in FIG. 4J. As shown in FIG. 3F, when the user specifies a certain street within the selected zip code area, the navigation system determines a middle point 33 of the street as a tentative destination. The navigation system calculates a route to the middle point 33, i.e., a partial route to the intended (true) destination 11, by detecting the address data of the middle point 33 from the map database and guides the user to the middle point 33.

Figure 4K:
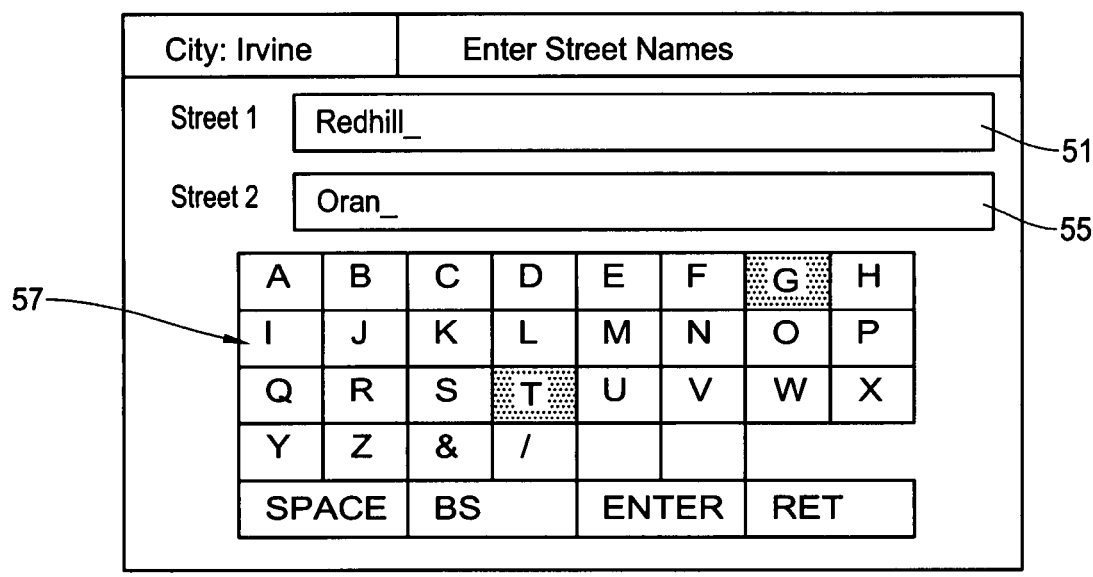

FIG. 4K is an example of screen for implementing the input method of FIG. 3E in which the intersection method is applied to the area specified by the city name. When the user selects both the city name method and the intersection method in the process of FIG. 4C, the navigation system may display a keyboard 57 and input fields 51 and 55 to specify an intersection within the specified city. After the user has selected the first street name, the navigation system may display a list of candidate second streets that intersect with the first street in a manner shown in FIG. 4H to assist the user to easily and quickly find the second street name from the candidate street names.

As shown in FIG. 3E, when the user specifies a certain intersection within the selected city, the navigation system determines an intersection 33 as a tentative destination. The navigation system calculates a route to the intersection 33, i.e., a partial route to the intended (true) destination 11, by detecting the address data of the intersection 33 from the map database and guides the user to the intersection 33.

FIG. 5 is a flow chart showing operational steps involved in the procedure for setting a tentative destination in the navigation system for partial route guidance in accordance with the present invention. This procedure starts when the user selects the partial route guidance on the screen of FIG. 4B when the address data for the intended destination is not found in the map database of the navigation system. In the step 101, the navigation system determines whether user (driver) selects the street name method or the intersection method for specifying a tentative location that the user considers to be proximate to the desired destination.

If it is determined that the user selects the street name method or the intersection method in the step 101, the navigation system will prompt the user to enter the street name or the intersection in the step 102. If the user does not select the street name method or the intersection, in the step 103, the navigation system prompts the user to enter a city name or a zip code for specifying a tentative location that the user considers to be proximate to the desired destination. Alternatively, the navigation system simply displays a list of input methods as shown in FIG. 4C and detects which method is selected by the user.

Then, in the step 104, the navigation system searches a list of candidate street names in response to the inputs made by the user in the step 102. In the case where the navigation system is designed to show a list of street names in the selected city name or zip code (FIG. 4J), the navigation system lists the candidate street names at, for example, the whole area of the specified city or zip code area. In the case where the navigation system is designed to directly determine a center point of the selected city name or area specified by the zip code as a tentative destination, the navigation system proceeds to the step 106 to conduct the route guidance to the center point.

In the step 105, the navigation system accepts the user's selection of the street name from the candidates street names. Finally, in the step 106, the navigation system sets the street name or the intersection as the tentative destination (proximate location) and starts the route guidance operation to the tentative destination. The user may be able to find the intended destination when he/she arrives at or comes close to the tentative destination. Especially, in the case where the user came to the intended destination before, it is expected that he/she may be familiar to the area proximate to the intended destination and can find location of the intended destination.

Figure 6:
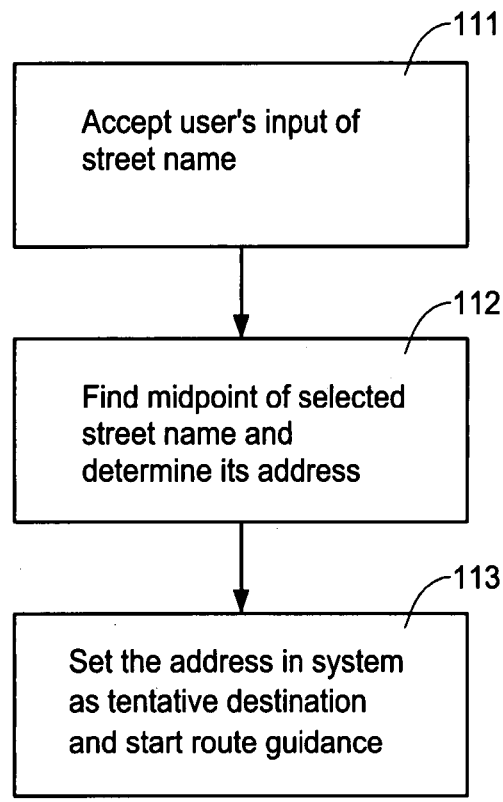
FIG. 6 is a flow chart showing detailed steps of the procedure where the navigation system set a tentative destination proximate to an intended final destination that is not included in the map database.

FIG. 6 is a flow chart showing an example of detailed steps of the procedure that corresponds to the step 105 in FIG. 5 where the navigation system set a tentative destination that thought to be proximate to the desired location. This procedure illustrates the steps involved in the street name method for setting a tentative destination when the user has selected a particular street. In the first step 111, the navigation system accepts the user's selection of a street name that is presumed to be located near the desired destination.

Then, in the step 112, the navigation system finds a middle point of the street specified by the user. In the map database, each street is constitute by a plurality of road segments where each road segment is defined by at least two absolute locations (start point and end point). Each location of the start point and the end point is expressed by longitude and latitude data. Thus, the middle point of the selected street can be easily determined based on the map data. After finding the middle point, the navigation system sets the middle point as a tentative destination and starts the route guidance operation in the step 113.

Figure 7:
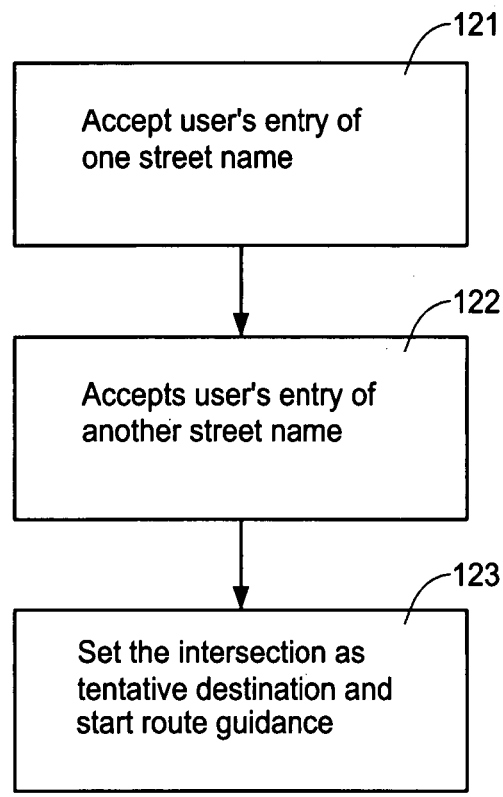
FIG. 7 is a flow chart showing the steps of setting the tentative destination by inputting information on an intersection under the present invention.

When the intersection method is used, the navigation system sets the intersection as a tentative destination in the manner described in the flow chart of FIG. 7. In this procedure, the user is prompted to enter a first street name and the navigation system accepts the first street name in the step 121. Then, the user is prompted to enter a second street name and the navigation system accepts the second street name in the step 122.

The navigation system may provide two screens for the user to enter the first and second street names separately as shown in FIGS. 4D and 4E, or may provide a single screen for the user to enter both the first and second street names in one display as shown in FIG. 4I. As the two street names have been determined, the navigation system will set the intersection defined by the two streets as a tentative destination and starts the route guidance operation in the step 123. Since the map database includes information concerning a link that connects two or more road segments, the address data of the intersection can be easily retrieved from the map database.

Figure 8:
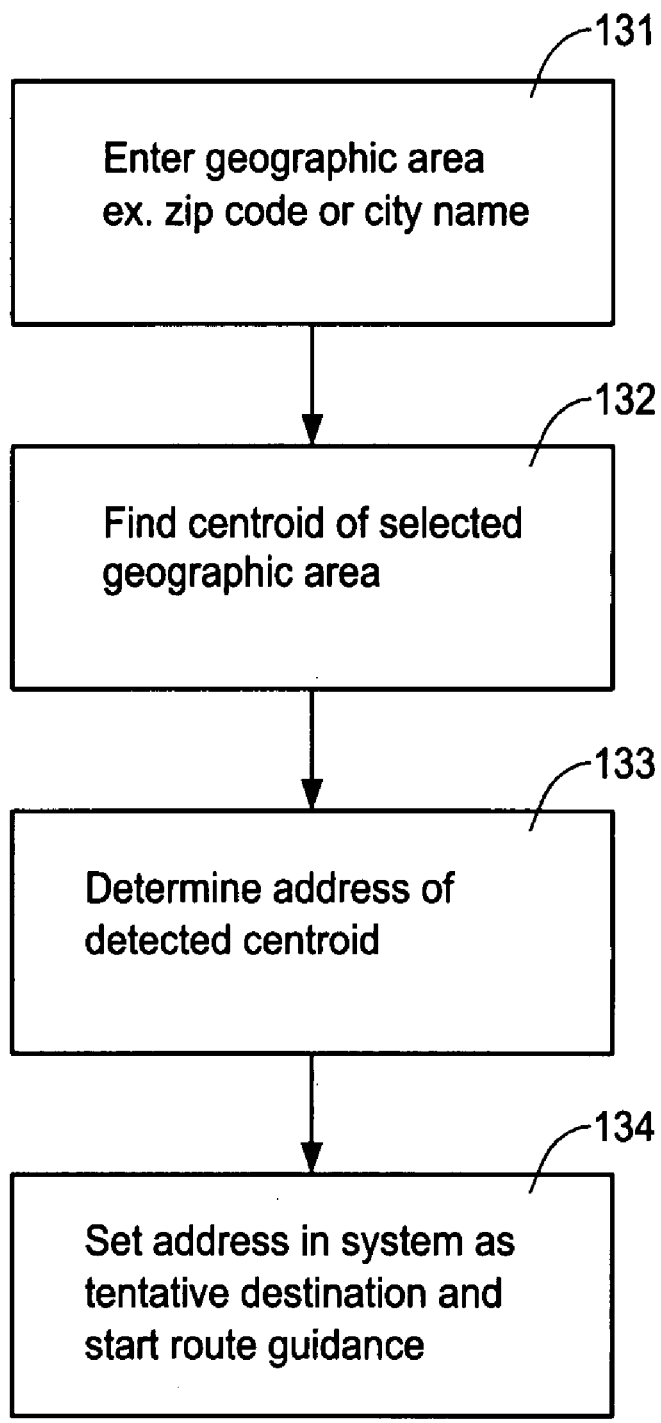
FIG. 8 is a flow chart showing the steps involved in a method that determines the center point of a selected geographic area such as a city or a zip code.

FIG. 8 is a flow chart showing the steps involved in the method that determines the center point of a selected geographic area such as a city name or a zip code. In the first step 131, the user is prompted to enter a city name or a zip code. After the user has entered a city name or a zip code, the navigation system determines the geographic area and finds the centroid (center point) of the selected geographic area in the step 132. Since the map database includes information concerning the topological shape, i.e., boarder lines, of each city and zip code, a location of the center point of the selected geographic area can be determined relatively easily.

After setting the center point of the selected geographic area, the navigation system finds the address of the center point in the step 133 if such a center point is not on a street. For example, the navigation system slightly shifts the center point to a nearby street to define the center location by the address data on the nearby street. Finally, the address of the center point is set as a tentative destination and the navigation system starts the route guidance operation in the step 134. In finding the nearby address of the center point in the step 133, the navigation system may place the preference on a higher class street (major street) and avoid minor residential streets for the address to simplify the process.

Figure 9:
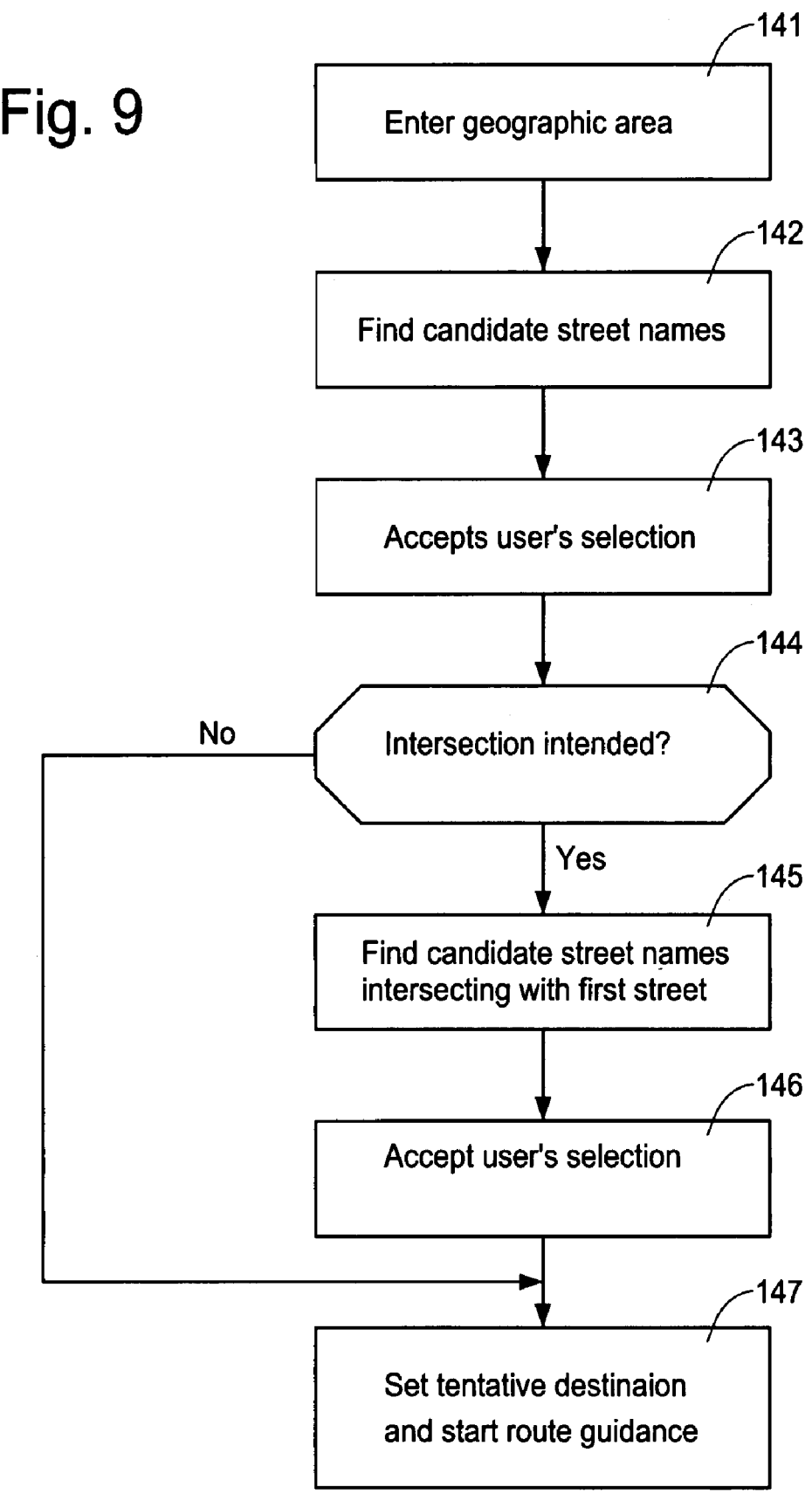
FIG. 9 is a flow chart showing the steps involved in a method that finds candidate street names for a selected geographic area such as a city or a zip code.

FIG. 9 is a flow chart showing the steps involved in the method that finds candidate street names for a selected geographic area such as a city name or a zip code. In other words, the flow chart of FIG. 9 shows the detailed steps of the main steps 103 and 104 in FIG. 5. In the step 141, the user enters a desired geographic area such as a city name or a zip code. Based on the user's input, the navigation system searches its map database for street names that exist in the geographic area and displays a list of candidate street names as shown in FIG. 4J for the user to select a desired street name in the step 142.

The user selects a desired street name from the candidate street names in the step 143. The navigation system then checks whether the user intends to enter (or has entered) another street name to specify an intersection in the step 144. If an intersection method is intended, in the step 145, the navigation system finds candidate street names that are located in the selected geographic area and are intersecting with the previously selected street.

The navigation system accepts the user's selection of the intersecting street and thus determines the intended intersection in the step 146. Finally, the navigation system sets the intersection as the tentative destination and starts route guidance in the step 147. When only one street name is selected by the user, i.e., the intersection method is not intended in the step 144, the navigation system will take an approximate middle point of the selected street as a tentative destination.

For searching the candidate street name, the navigation system may only search major streets and exclude lower class streets. This may be useful in order to reduce the number of candidate streets that will be retrieved from the database in response to the user's input, thereby making the procedure to select a candidate street more efficient. In both examples of FIGS. 8 and 9 noted above, other means for specifying a geographic area such as a telephone area code may also be used.

Figure 10:
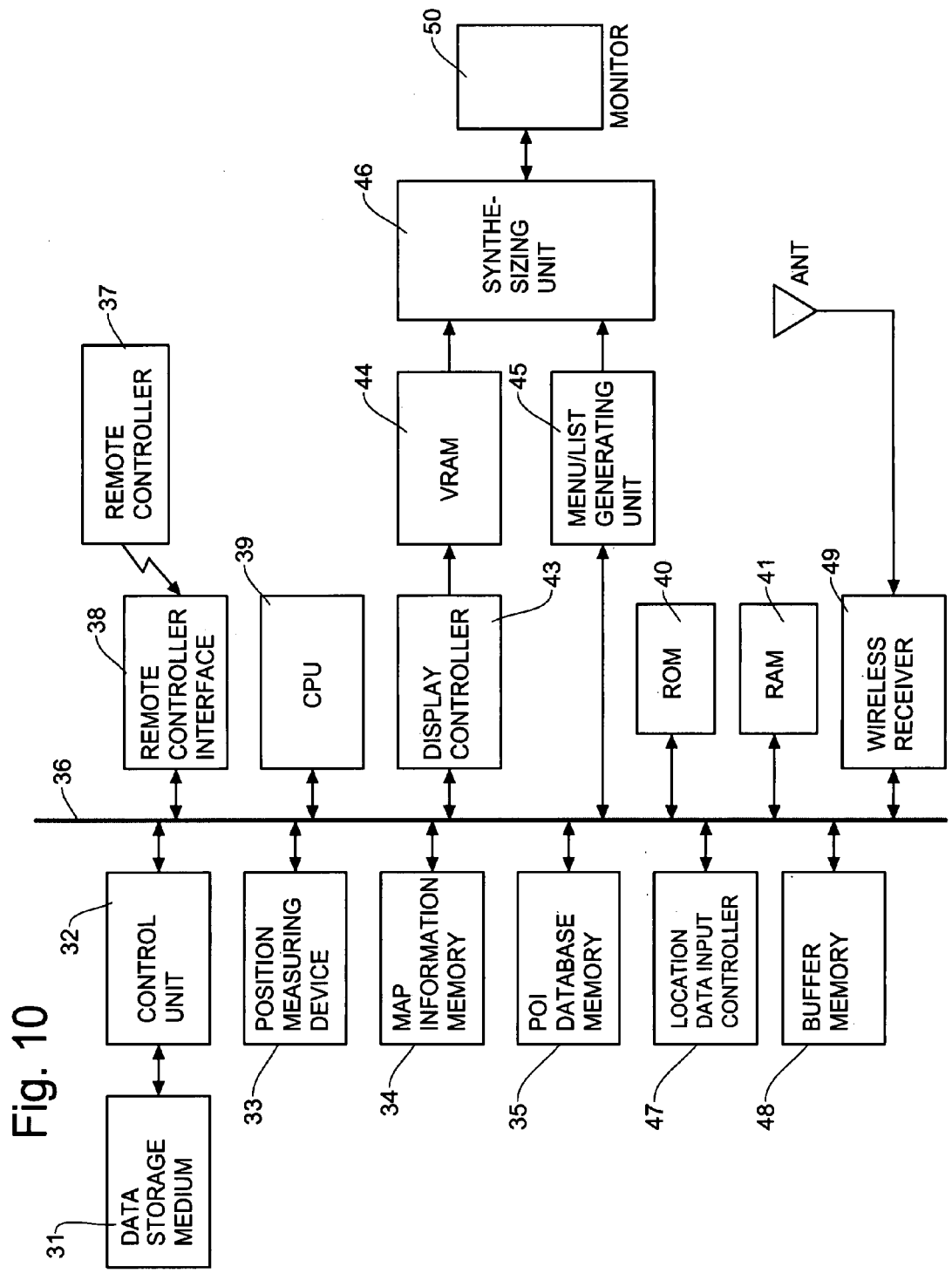
FIG. 10 is a block diagram showing an example of configuration of a vehicle navigation system implementing the adaptive scroll under the present invention.

FIG. 10 is a block diagram showing a structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means constituting the map database. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from satellites for detecting a current location, and etc.

The block diagram of FIG. 10 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 10, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a location data input controller 47 for controlling the operation for inputting a tentative location under the present invention, a wireless transmitter 49 for wireless communication to retrieve data from a remote server, a buffer memory 48 for temporally storing data for ease of data processing, and a monitor (display) 50.

The location data input controller 47 can be a part of the CPU 39 or a separate processor. The ROM 40 stores a program that performs the operation described with reference to the flow charts, which is executed by the location data input controller 47 or the CPU 39. The data storage medium 31 may store preselected data such as locations of the center points of geographic areas, such as cities, zip codes, etc. Moreover, it may also store middle points of major streets for the purpose of setting a tentative destination described above.

As has been described above, according to the present invention, in the case where address data for an intended destination is not found in the map database, the navigation system is designed to accept a tentative destination which is close to the intended destination through various input methods. The navigation system calculates a route to the tentative destination and guides the user to the tentative destination through the calculated route. The user may be able to find the intended destination when he/she arrives at or comes close to the tentative destination. Especially, if the user came to the intended destination before, he/she may be familiar with the area proximate to the intended destination and can find the location of the intended destination once he/she arrives at the tentative destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for inputting data indicating a tentative destination for a navigation system, comprising the following steps of:
    allowing a user to specify an intended destination in the navigation system and searching address data indicating the intended destination in a map database of the navigation system;
    through a display screen of the navigation system, notifying the user that the address data indicating the intended destination is not found in the map database and prompting the user to determine whether to proceed for finding a partial route to the intended destination;
    selecting a method for inputting data indicating a tentative destination which is considered proximate to the intended destination;
    allowing the user to specify the tentative destination in the navigation system through the selected input method; and
    determining a location of the tentative destination and detecting address data indicating the location of the tentative destination for calculating the partial route to the intended destination.

2. A method for inputting data indicating a tentative destination as defined in claim 1, further comprising a step of conducting a route guidance operation to the tentative destination.

3. A method for inputting data indicating a tentative destination as defined in claim 1, wherein said step of detecting the address data of the tentative destination includes a step of determining the address data based on map data indicating road segments constituting a street that is associated with the tentative destination.

4. A method for inputting data indicating a tentative destination as defined in claim 1, wherein said input method allows the user to specify a street name which is considered by the user proximate to the intended destination, and wherein said step of determining the location of the tentative destination includes a step of finding a middle point of the street specified by the user and determining the address data of the middle point.

5. A method for inputting data indicating a tentative destination as defined in claim 1, wherein said input method allows the user to specify an intersection which is considered by the user proximate to the intended destination by selecting two street names.

6. A method for inputting data indicating a tentative destination as defined in claim 1, wherein said input method allows the user to specify a city name which is considered by the user proximate to the intended destination, and wherein said step of determining the location of the tentative destination includes a step of finding a center point of the city specified by the user and determining the address data of the center point.

7. A method for inputting data indicating a tentative destination as defined in claim 1, wherein said input method allows the user to specify an area by a zip code which is considered by the user proximate to the intended destination, and wherein said step of determining the location of the tentative destination includes a step of finding a center point of the area specified by zip code and determining the address data of the center point.

8. A method for inputting data indicating a tentative destination as defined in claim 1, wherein said input method allows the user to specify a geographical area by a city name or a zip code and also to specify a street name, and wherein said step of determining the location of the tentative destination includes a step of finding a middle point of the specified street within the specified geographical area and determining the address data of the middle point.

9. A method for inputting data indicating a tentative destination as defined in claim 1, wherein said input method allows the user to specify a geographical area by a city name or a zip code and also to specify an intersection by selecting two street names, and wherein said step of determining the location of the tentative destination includes a step of finding the intersection within the specified geographical area.

10. A method for inputting data indicating a tentative destination as defined in claim 1, wherein said navigation system displays a list of candidate street names so that the user selects one or more street names from the list.

11. An apparatus for inputting data indicating a tentative destination for a navigation system, comprising:
    an input device for allowing a user to specify an intended destination in the navigation system and searching address data indicating the intended destination in a map database of the navigation system;
    a display for notifying the user that the address data indicating the intended destination is not found in the map database and prompting the user to determine whether to proceed for finding a partial route to the intended destination;
    a CPU for controlling an overall operation of the navigation system where the CPU controls the display to show a screen so that the user can select a method for inputting data indicating a tentative destination which is considered proximate to the intended destination;

wherein the input device and the display allow the user to specify the tentative destination in the navigation system through the selected input method; and wherein the CPU determines a location of the tentative destination and detects address data indicating the location of the tentative destination for calculating the partial route to the intended destination.

12. An apparatus for inputting data indicating a tentative destination as defined in claim 11, wherein the navigation system conducts a route guidance operation to the tentative destination based on the address data determined by the CPU.

13. An apparatus for inputting data indicating a tentative destination as defined in claim 11, wherein said CPU detects the address data based on map data indicating road segments constituting a street that is associated with the tentative destination.

14. An apparatus for inputting data indicating a tentative destination as defined in claim 11, wherein said input method allows the user to specify a street name which is considered by the user proximate to the intended destination, and wherein said CPU detects a middle point of the street specified by the user and determines the address data of the middle point.

15. An apparatus for inputting data indicating a tentative destination as defined in claim 11, wherein said input method allows the user to specify an intersection which is considered by the user proximate to the intended destination by selecting two street names.

16. An apparatus for inputting data indicating a tentative destination as defined in claim 11, wherein said input method allows the user to specify a city name which is considered by the user proximate to the intended destination, and wherein said CPU detects a center point of the city specified by the user and determines the address data of the center point.

17. An apparatus for inputting data indicating a tentative destination as defined in claim 11, wherein said input method allows the user to specify an area by a zip code which is considered by the user proximate to the intended destination, and wherein said CPU detects a center point of the area specified by zip code and determines the address data of the center point.

18. An apparatus for inputting data indicating a tentative destination as defined in claim 11, wherein said input method allows the user to specify a geographical area by a city name or a zip code and also to specify a street name, and wherein said CPU detects a middle point of the specified street within the specified geographical area and determines the address data of the middle point.

19. An apparatus for inputting data indicating a tentative destination as defined in claim 11, wherein said input method allows the user to specify a geographical area by a city name or a zip code and also to specify an intersection by selecting two street names, and wherein said CPU detects the intersection within the specified geographical area and determines the address data of the intersection.

20. An apparatus for inputting data indicating a tentative destination as defined in claim 11, wherein said navigation system displays a list of candidate street names so that the user selects one or more street names from the list.

\* \* \* \* \*